United States Patent
Hirata et al.

(10) Patent No.: US 10,895,282 B2
(45) Date of Patent: Jan. 19, 2021

(54) MAGNETIC BEARING DEVICE AND FLUID MECHANICAL SYSTEM

(71) Applicant: DAIKIN INDUSTRIES, LTD., Osaka (JP)

(72) Inventors: Kazuya Hirata, Osaka (JP); Atsushi Sakawaki, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 32 days.

(21) Appl. No.: 16/325,976

(22) PCT Filed: Aug. 18, 2016

(86) PCT No.: PCT/JP2016/003780
§ 371 (c)(1),
(2) Date: Feb. 15, 2019

(87) PCT Pub. No.: WO2018/033947
PCT Pub. Date: Feb. 22, 2018

(65) Prior Publication Data
US 2019/0203767 A1 Jul. 4, 2019

(51) Int. Cl.
*F16C 32/04* (2006.01)
*H02K 7/09* (2006.01)
*H02K 7/14* (2006.01)

(52) U.S. Cl.
CPC ............ *F16C 32/048* (2013.01); *F16C 32/04* (2013.01); *H02K 7/09* (2013.01); *H02K 7/14* (2013.01);
(Continued)

(58) Field of Classification Search
CPC .... F16C 32/04; F16C 32/0402; F16C 32/047; F16C 32/0474; F16C 32/0476;
(Continued)

(56) References Cited

U.S. PATENT DOCUMENTS 6,121,704 A * 9/2000 Fukuyama .......... F16O 32/0459
310/90.5
6,359,357 B1 * 3/2002 Blumenstock ...... F16O 32/0465
310/90.5
(Continued)

FOREIGN PATENT DOCUMENTS

CN 103758766 A 4/2014
EP 2 677 176 A1 12/2013
(Continued)

OTHER PUBLICATIONS

Ge Yanjun, et al., "A Rotor Displacement Detection System for Power Magnetic Bearing"; Mechanical Science and Technology for Aerospace Engineering, vol. 28, No. 2, Feb. 28, 2009.

*Primary Examiner* — Tulsidas C Patel
*Assistant Examiner* — Rashad H Johnson
(74) *Attorney, Agent, or Firm* — Birch, Stewart, Kolasch & Birch, LLP

(57) ABSTRACT

A controller performs, in a first mode, a first operation for controlling composite electromagnetic force of electromagnets such that a target member moves within a predetermined moving range, and a second operation for acquiring temperature drift correlation information indicative of a correlation between a reference value and an input-output characteristic of a position sensor, based on the reference value and the input-output characteristic of the position sensor in the first operation. The controller performs, in a second mode, a third operation for controlling the composite electromagnetic force of the electromagnets according to a signal level of a detection signal from the position sensor, and a fourth operation for compensating the input-output characteristic of the position sensor in the third operation, based on the temperature drift correlation information and the reference value in the third operation.

6 Claims, 11 Drawing Sheets

(52) U.S. Cl.
CPC ........ *F16C 32/0402* (2013.01); *F16C 32/047* (2013.01); *F16C 32/0474* (2013.01); *F16C 32/0476* (2013.01); *F16C 2380/26* (2013.01)

(58) Field of Classification Search
CPC ..... F16C 32/048; F16C 2380/26; H02K 7/09; H02K 7/10; H02K 7/1008; H02K 7/14; H02K 11/25; H02K 11/30; H02K 11/33
USPC .......... 310/68 B, 71, 89, 90.5; 384/278, 548
See application file for complete search history.

(56) References Cited

U.S. PATENT DOCUMENTS

| | | |
|---|---|---|
| 7,564,670 B2 | 7/2009 | Kozaki et al. |
| 2007/0278884 A1 | 12/2007 | Kozaki et al. |
| 2009/0046963 A1* | 2/2009 | Ozaki .................... F16C 33/00 384/446 |
| 2009/0127956 A1* | 5/2009 | Ozaki ................... F04D 25/024 310/90.5 |
| 2009/0136335 A1* | 5/2009 | Nakazeki ............... F16O 19/52 415/13 |
| 2018/0087509 A1* | 3/2018 | Johnson ................. F25B 1/047 |

FOREIGN PATENT DOCUMENTS

| | | |
|---|---|---|
| JP | 4-40308 U | 4/1992 |
| JP | 11-324970 A | 11/1999 |
| JP | 2003-329432 A | 11/2003 |
| JP | 2007-327639 A | 12/2007 |

* cited by examiner

| REFRIGERANT TEMPERATURE (REFERENCE VALUE) | DRIFT AMOUNT (INPUT-OUTPUT CHARACTERISTIC) |
|---|---|
| [degC] | [mm] |
| 23 | 0 |
| 45 | 0.007 |
| 60 | 0.01 |

| REFRIGERANT TEMPERATURE (REFERENCE VALUE) | DRIFT AMOUNT (INPUT-OUTPUT CHARACTERISTIC) | |
| --- | --- | --- |
| | SLOPE | INTERCEPT |
| ... | ... | ... |
| ... | ... | ... |
| ... | ... | ... |

MAGNETIC BEARING DEVICE AND FLUID MECHANICAL SYSTEM

TECHNICAL FIELD

The present disclosure relates to a magnetic bearing device and a fluid mechanical system including the same.

BACKGROUND ART

A conventionally known magnetic bearing is configured to support a target member such as a rotational shaft in a contactless manner using a composite electromagnetic force of a plurality of electromagnets. For example, Patent Document 1 discloses a magnetic bearing device including this type of magnetic bearing. The magnetic bearing device of Patent Document 1 is configured to detect the position of an object (target member) with a position detection sensor, input a resulting detection signal (an output from the position detection sensor) as a feedback signal to a control circuit, and control an electromagnetic force of electromagnets so as to retain the object at a fixed position. The magnetic bearing device of Patent Document 1 thus controls the position of the object in accordance with the output from the position detection sensor.

Patent Document 1 discloses in FIG. 4 a configuration of a position sensor that reduces a drift in a sensor output following a change in temperature (a change in an input-output characteristic of the sensor following a change in temperature, also known as temperature drift). This configuration includes two position detection units arranged to face each other with a measurement target object interposed therebetween. Outputs from the two position detection units are input to a differential amplification circuit via two sensor controllers, and used for arithmetic operation, whereby the temperature drift of the position sensor can be reduced.

CITATION LIST

Patent Document

PATENT DOCUMENT 1: Japanese Utility Model Publication No. H04-40308

SUMMARY OF THE INVENTION

Technical Problem

The configuration disclosed in FIG. 4 of Patent Document 1, however, the two position detection units do not necessarily have an equivalent temperature drift (a change in the input-output characteristic following a change in temperature). If the two position detection units have different temperature drifts, the differential amplification circuit fails to cancel out such temperature drifts of the two position detection units. Consequently, signal components depending on the temperature drifts of the position detection units remain in the signals output from the differential amplification circuit, resulting in errors in magnetic levitation control (control for supporting a target member in a contactless manner using the composite electromagnetic force of electromagnets in a magnetic bearing), which is performed in accordance with the signals output from the differential amplification circuit. Thus, it is difficult for the configuration disclosed in FIG. 4 of Patent Document 1 to reduce errors in magnetic levitation control resulting from the temperature drift of the position sensor.

In view of the foregoing, an object of the present disclosure is to provide a magnetic bearing device capable of reducing errors in magnetic levitation control resulting from the temperature drift of the position sensor.

Solution to the Problem

A magnetic bearing device according to a first aspect of the present disclosure includes a magnetic bearing (20) including a plurality of electromagnets (51, 52) and configured to support a target member in a contactless manner using composite electromagnetic force (F) of the plurality of electromagnets (51, 52); a position sensor (30) configured to output a detection signal having a signal level according to a position of the target member in a predetermined position detection direction; and a controller (40) having a first mode and a second mode and configured to acquire a reference value (R) that correlates with a change in an input-output characteristic of the position sensor (30) following a change in an ambient temperature of the position sensor (30). The controller (40) performs, in the first mode, in the first mode, a movement control operation for controlling the composite electromagnetic force (F) of the plurality of electromagnets (51, 52) such that the target member moves within a predetermined moving range in the position detection direction, and an information acquisition operation for acquiring temperature drift correlation information indicative of a correlation between the reference value (R) and the input-output characteristic of the position sensor (30), based on the reference value (R) and the input-output characteristic of the position sensor (30) in the movement control operation, and in the second mode, a magnetic levitation control operation for controlling the composite electromagnetic force (F) of the plurality of electromagnets (51, 52) in accordance with the signal level of the detection signal from the position sensor (30), and a temperature compensation operation for compensating the input-output characteristic of the position sensor (30) in the magnetic levitation control operation, based on the temperature drift correlation information and the reference value (R) in the magnetic levitation control operation.

In the first aspect, the movement control operation and the information acquisition operation are performed in the first mode, and thus, an input-output characteristic (an input-output characteristic that is unique to the position sensor (30) mounted on the magnetic bearing device) of the position sensor (30) in a real machine can be acquired corresponding to the reference value (R). In this manner, the temperature drift correlation information indicative of the correlation between the input-output characteristic of the position sensor (30) in the real machine and the reference value (R) can be acquired. In addition, the magnetic levitation control operation and the temperature compensation operation are performed in the second mode, and thus, the input-output characteristic of the position sensor (30) in the magnetic levitation control operation can be accurately compensated based on the temperature drift correlation information indicative of the correlation between the input-output characteristic of the position sensor (30) in the real machine and the reference value (R).

According to a second aspect of the present disclosure, the magnetic bearing device according to the first aspect further includes a touchdown bearing (6) configured to come into contact with the target member moving toward the magnetic bearing (20) in a space between the plurality of electromagnets (51, 52), thereby avoiding contact between the target member and the magnetic bearing (20). The controller (40)

performs the movement control operation in the first mode such that the target member moves from one end to another end of a movable range in the position detection direction restricted by the touchdown bearing (6).

In the second aspect, the touchdown bearing (6) is capable of restricting the movable range of the target member in the position detection direction. To correctly estimate the input-output characteristic of the position sensor (30), the movable range of the target member in the position detection direction in the movement control operation is preferably restricted within a predetermined range. With the touchdown bearing (6) successfully restricting the movable range of the target member in the position detection direction, the input-output characteristic of the position sensor (30) in the real machine can be correctly estimated. In this manner, temperature drift correlation information exactly indicative of the correlation between the input-output characteristic of the position sensor (30) in the real machine and the reference value (R) can be acquired, and thus, the input-output characteristic of the position sensor (30) in the magnetic levitation control operation can be more accurately compensated based on the temperature drift correlation information.

According to a third aspect of the present disclosure, in the magnetic bearing device according to the second aspect, the target member has an axial form. The plurality of electromagnets (51, 52) include first and second electromagnets (51, 52) facing each other in a radial direction of the target member with the target member interposed therebetween, and third and fourth electromagnets (53, 54) facing each other in the radial direction of the target member with the target member interposed therebetween, the direction in which the third and fourth electromagnets (53, 54) face each other intersecting with the direction in which the first and second electromagnets (51, 52) face each other. The position detection direction of the position sensor (30) corresponds to the direction in which the first and second electromagnets (51, 52) face each other. The touchdown bearing (6) is a radial touchdown bearing (7) through which the target member is inserted. The radial touchdown bearing (7) is configured to come into contact, on an inner peripheral surface thereof, with the target member moving in a radial direction of the radial touchdown bearing (7), thereby avoiding contact between the target member and the magnetic bearing (20). The controller (40) performs the movement control operation in the first mode such that the target member moves in a circumferential direction of the radial touchdown bearing (7) while remaining in contact with the inner peripheral surface of the radial touchdown bearing (7).

In the third aspect, the inner peripheral surface of the radial touchdown bearing (7) is capable of restricting the movable range of the target member in the position detection direction, and thus, the input-output characteristic of the position sensor (30) in the real machine can be correctly estimated. In this manner, temperature drift correlation information exactly indicative of the correlation between the input-output characteristic of the position sensor (30) in the real machine and the reference value (R) can be acquired, and thus, the input-output characteristic of the position sensor (30) in the magnetic levitation control operation can be more accurately compensated based on the temperature drift correlation information.

According to a fourth aspect of the present disclosure, in the magnetic bearing device according to the second aspect, the target member has a disk form. The plurality of electromagnets (51, 52) include first and second electromagnets (51, 52) facing each other in an axial direction of the target member. The position detection direction of the position sensor (30) corresponds to a direction in which the first and second electromagnets (51, 52) face each other. The touchdown bearing (6) includes first and second thrust touchdown bearings (8) facing each other in the axial direction of the target member with the target member interposed therebetween. The first and second thrust touchdown bearings (8) are configured to come into contact, on their surfaces facing each other, with the target member moving in the direction in which the first and second thrust touchdown bearings (8) face each other, thereby avoiding contact between the target member and the magnetic bearing (20). The controller (40) performs the movement control operation in the first mode such that the target member moves from the surface of one of the first and second thrust touchdown bearings (8) to the surface of the other thrust touchdown bearing (8), the surfaces facing each other.

In the fourth aspect, the first and second thrust touchdown bearings (8) facing each other are capable of restricting the movable range of the target member in the position detection direction, and thus, the input-output characteristic of the position sensor (30) in the real machine can be correctly estimated. In this manner, temperature drift correlation information exactly indicative of the correlation between the input-output characteristic of the position sensor (30) in the real machine and the reference value (R) can be acquired, and thus, the input-output characteristic of the position sensor (30) in the magnetic levitation control operation can be more accurately compensated based on the temperature drift correlation information.

A fluid mechanical system according to a fifth aspect of the present disclosure includes the magnetic bearing device according to any one of the first to fourth aspects, a fluid machine (3), a rotary electric machine (4), and a rotation shaft (5) coupling the fluid machine (3) and the rotary electric machine (4). The magnetic bearing device is configured to support a target portion of the rotation shaft (5) in a contactless manner using composite electromagnetic force (F) of the plurality of electromagnets (51, 52).

The magnetic bearing device in the fifth aspect is capable of reducing errors in magnetic levitation control resulting from the temperature drift of the position sensor (30).

Advantages of the Invention

According to the first aspect of the present disclosure, the input-output characteristic of the position sensor (30) in the magnetic levitation control operation can be more accurately compensated based on the temperature drift correlation information indicative of the correlation between the input-output characteristic of the position sensor (30) in the real machine and the reference value (R), and thus, errors in magnetic levitation control resulting from the temperature drift of the position sensor (30) can be reduced.

According to the second, third, and fourth aspects of the present disclosure, the input-output characteristic of the position sensor (30) in the magnetic levitation control operation can be more accurately compensated based on the temperature drift correlation information exactly indicative of the correlation between the input-output characteristic of the position sensor (30) in the real machine and the reference value (R), and thus, errors in magnetic levitation control resulting from the temperature drift of the position sensor (30) can be further reduced.

The magnetic bearing device according to the fifth aspect of the present disclosure is capable of reducing errors in magnetic levitation control resulting from the temperature drift of the position sensor (30), thereby enhancing the operational efficiency of the fluid mechanical system.

DESCRIPTION OF EMBODIMENTS

Figure 1:
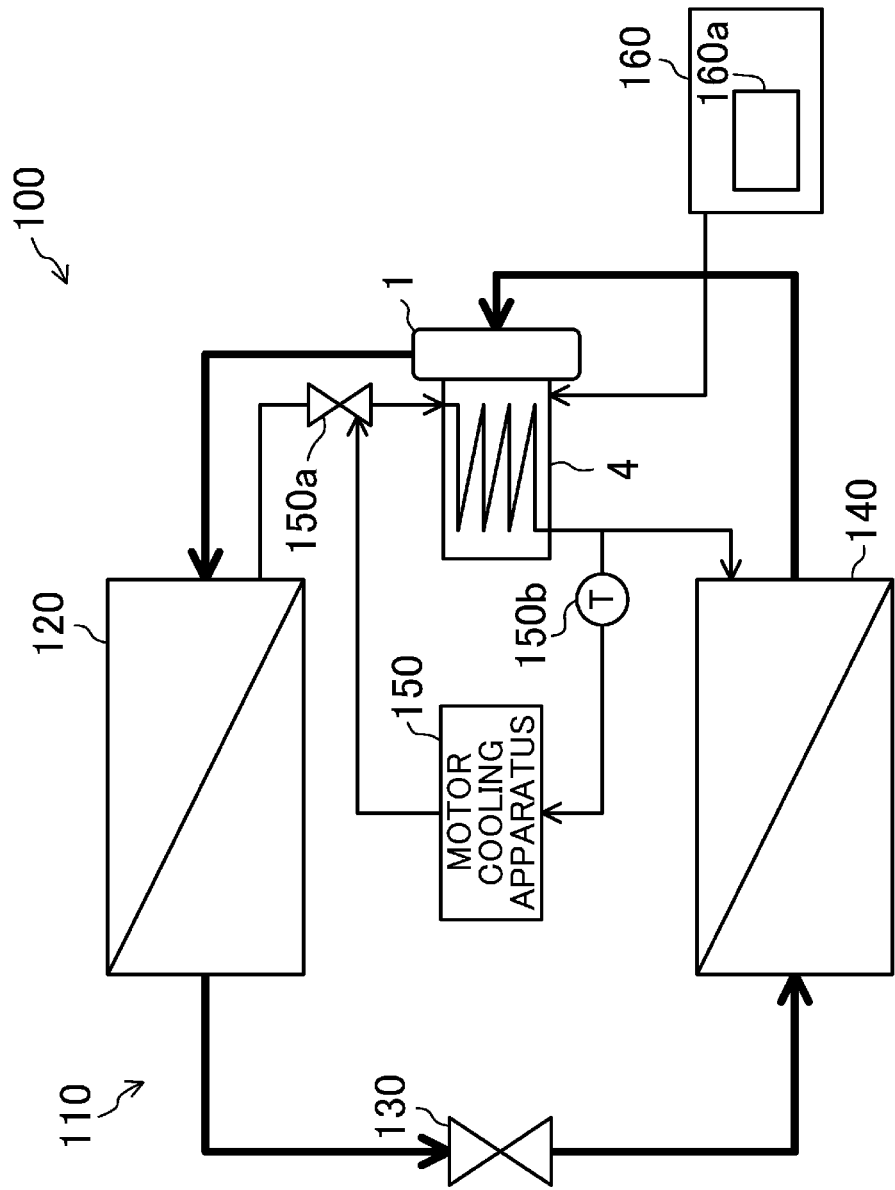
FIG. 1 is a piping diagram illustrating an exemplary configuration of an air conditioner according to an embodiment.

Embodiments will be described below in detail with reference to the accompanying drawings. The same or equivalent components throughout the drawings are denoted with the same reference numerals, and descriptions thereof will not be repeatedly provided.

(Air Conditioner)

FIG. 1 illustrates an exemplary configuration of an air conditioner (100) according to an embodiment. This air conditioner (100) includes a refrigerant circuit (110), a motor cooling apparatus (150), and a motor control device (160).

The refrigerant circuit (110) includes a compressor (1), a condenser (120), an expansion valve (130), and an evaporator (140), and is configured to perform a refrigeration cycle with a circulating refrigerant. For example, each of the condenser (120) and the evaporator (140) is comprised of a cross-fin type heat exchanger, and the expansion valve (130) is comprised of a motor valve. The refrigerant circuit (110) is provided with various types of sensors (not illustrated), such as a refrigerant pressure sensor and a refrigerant temperature sensor.

The compressor (1) includes a motor (4) for driving a compression mechanism. The compressor (1) is configured to cool the motor (4) with part of the refrigerant in the condenser (120) flowing inside the motor (4). In the present example, the motor (4) is provided with a refrigerant flow path, one end of the refrigerant flow path being connected to the condenser (120) via a first pipe and the other end of the refrigerant flow path being connected to the evaporator (140) via a second pipe. The first pipe is provided with a motor valve (150a) with an adjustable opening degree, while the second pipe is provided with a refrigerant temperature sensor (150b) configured to detect the temperature of the refrigerant (i.e., the refrigerant used for cooling the motor (4)) in the second pipe. The motor cooling apparatus (150) is configured to control the flow rate of the refrigerant in the motor (4) by adjusting the opening degree of the motor valve (150a) in accordance with the detection value of the refrigerant temperature sensor (150b). This control can maintain the temperature of the motor (4) within a predetermined temperature range.

The motor control device (160) is configured to supply power to the motor (4). The motor control device (160) is configured to control power supplied to the motor (4), thereby controlling the start/stop and rotational speed of the motor (4). In the present example, the motor control device (160) includes a control board (160a) on which components such as a converter circuit, an inverter circuit, and a motor control unit (all not illustrated) are mounted. The motor control unit includes an arithmetic circuit such as a CPU, and a memory, and is configured to acquire information such as the rotational speed of the motor (4) and the current value of the motor (4), and control the switching operation of the inverter circuit based on the acquired information. Thus, information such as the rotational speed of the motor (4) and the current value of the motor (4) can be acquired from the motor control unit. Furthermore, the control board (160a) is provided with a board temperature sensor (not illustrated) for protecting circuit elements such as a switching element in the inverter circuit from heat. The motor control unit acquires the detection value of the board temperature sensor and controls the switching operation of the inverter circuit based on the acquired detection value. Thus, the detection value of the board temperature sensor (i.e., the temperature of the control board (160a)) can be acquired from the motor control unit.

(Compressor)

Figure 2:
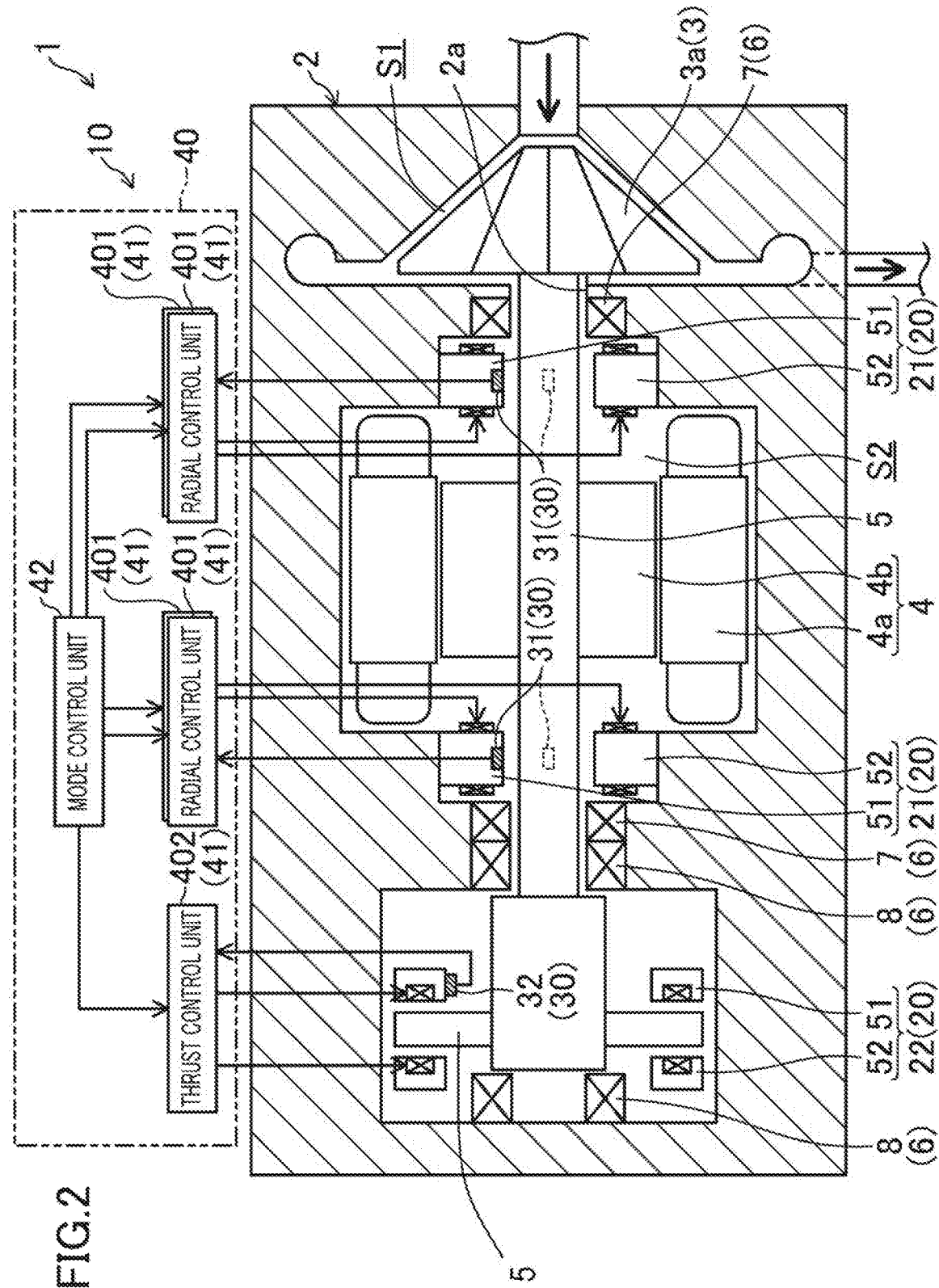
FIG. 2 is a longitudinal sectional view illustrating an exemplary configuration of a compressor according to the embodiment.

FIG. 2 illustrates an exemplary configuration of the compressor (1) illustrated in FIG. 1. The compressor (1) is an example of a fluid mechanical system. In the present example, the compressor (1) is a turbocompressor, and includes a casing (2), a compression mechanism (3), the motor (4), a rotation shaft (5), and a magnetic bearing device (10).

[Casing]

The casing (2) has a cylindrical shape with opposite closed ends, and is disposed with its axis horizontal. Space inside the casing (2) is divided by a wall portion (2a). Space on the right side of the wall portion (2a) serves as a compression mechanism chamber (S1) for accommodating the compression mechanism (3), and space on the left side of the wall portion (2a) serves as a motor chamber (S2) for accommodating the motor (4). The rotation shaft (5) extending in the axial direction in the casing (2) connects the compression mechanism (3) and the motor (4).

[Compression Mechanism (Fluid Machine)]

The compression mechanism (3) is configured to convert the rotational energy of the motor (4) into fluid energy, thereby compressing a fluid (in the present example, the refrigerant). In the present example, the compression mechanism (3) includes an impeller (3a). The impeller (3a) has a substantially conical outer shape including a plurality of blades and, is fixed to one end of the rotation shaft (5). The compression mechanism (3) is an example of a fluid machine configured to convert either one of the fluid energy or the rotational energy into the other.

[Motor (Rotary Electric Machine)]

The motor (4) is configured to convert electric energy into rotational energy, thereby rotationally driving the rotation shaft (5). In the present example, the motor (4) includes a stator (4a) and a rotor (4b). The stator (4a) has a cylindrical shape and is fixed inside the casing (2). The rotor (4b) has a columnar shape and is inserted inside the stator (4a) in a rotatable manner relative to the inner periphery of the stator (4a). The rotor (4b) has an axial hole at the center portion, into which the rotation shaft (5) is inserted and fixed. The motor (4) is an example of a rotary electric machine configured to convert either one of electric energy or rotational energy into the other.

[Magnetic Bearing Device]

The magnetic bearing device (10) includes one or a plurality of (in the present example, three) magnetic bearings (20), one or a plurality of (in the present example, five) position sensors (30), one or a plurality of (in the present example, four) touchdown bearings (6), and a controller (40).

<Magnetic Bearing>

The magnetic bearing (20) includes a plurality of electromagnets (for example, first and second electromagnets (51, 52)), and is configured to support a target member (in the present example, a target portion of the rotation shaft (5)) in a contactless manner using a composite electromagnetic force (F) of the plurality of electromagnets. Specifically, the magnetic bearing (20) includes a pair of electromagnets (for example, a set of first and second electromagnets (51, 52)) facing each other with the target member interposed therebetween, and is configured to support the target member in a contactless manner using a composite electromagnetic force (F) of the pair of electromagnets. The magnetic bearing (20) controls a pair of currents flowing through the pair of electromagnets (for example, a set of first and second currents (i1, i2) flowing through the respective first and second electromagnets (51, 52)), thereby controlling the composite electromagnetic force (F) of the pair of electromagnets and controlling the position of the target member in the direction in which the pair of electromagnets face each other.

In the present example, three magnetic bearings (20) are composed of two radial magnetic bearings (21) and one thrust magnetic bearing (22). Hereinafter, one of the two radial magnetic bearings (21) is referred to as a "first radial magnetic bearing (21)," and the other is referred to as a "second radial magnetic bearing (21)."

<<Radial Magnetic Bearing>>

Figure 3:
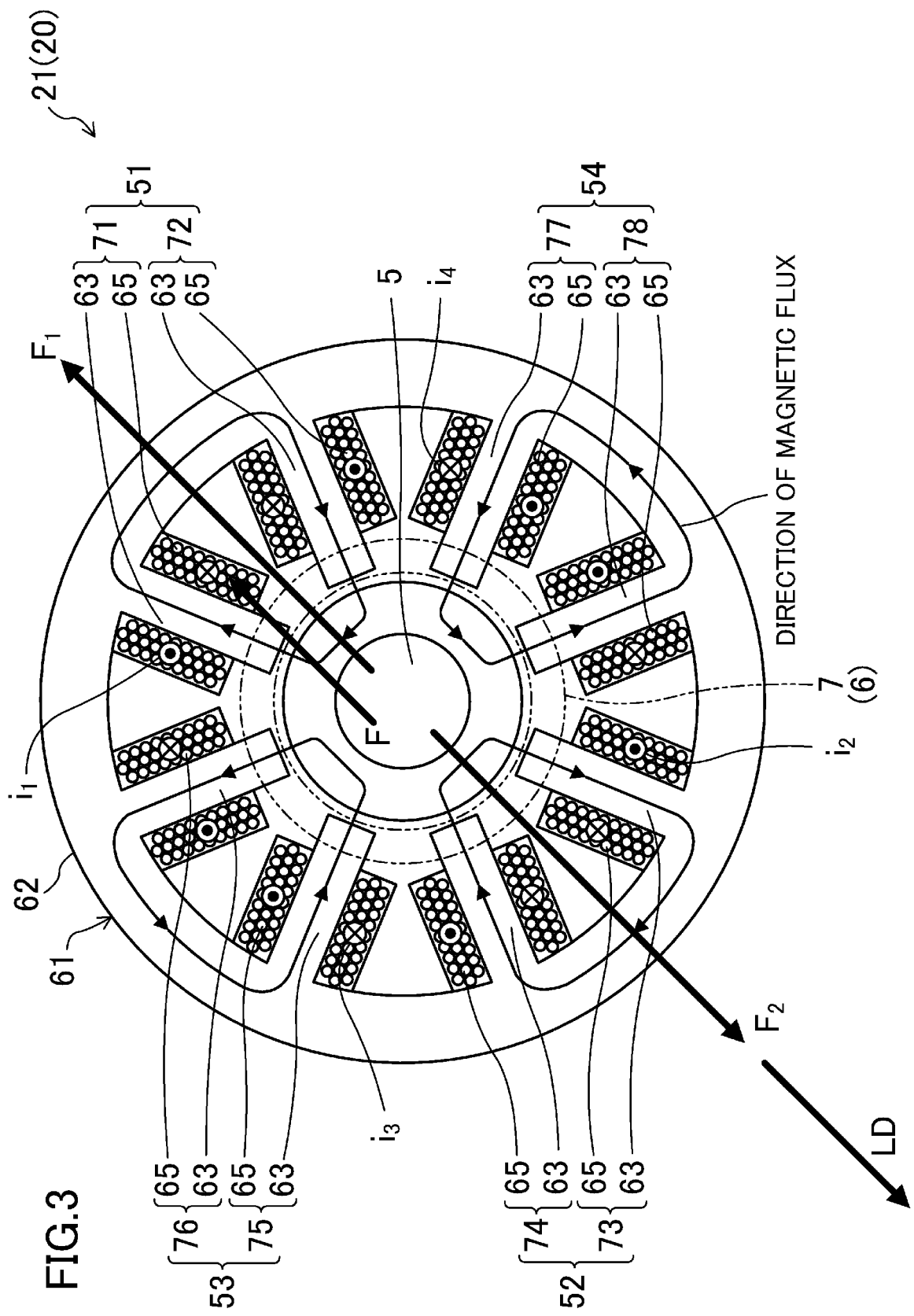
FIG. 3 is a cross-sectional view illustrating an exemplary configuration of a radial magnetic bearing.
Figure 4:
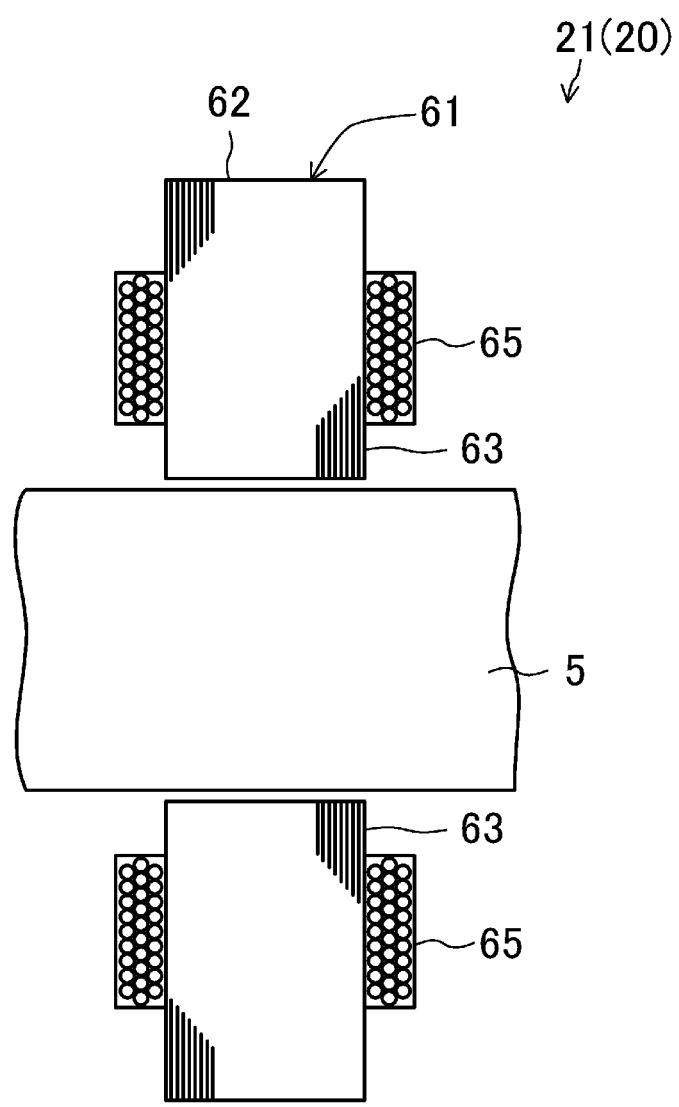
FIG. 4 is a longitudinal section view illustrating an exemplary configuration of the radial magnetic bearing.

As illustrated in FIGS. 3 and 4, the radial magnetic bearing (21) includes first to fourth electromagnets (51 to 54) and serves as a heteropolar radial magnetic bearing. The first and second electromagnets (51, 52) face each other with a target portion (axial member) of the rotation shaft (5) interposed therebetween, and support the target portion of the rotation shaft (5) in a contactless manner using the composite electromagnetic force (F) of the first and second electromagnets (51, 52). The third and fourth electromagnets (53, 54) face each other with the target portion (axial member) of the rotation shaft (5) interposed therebetween, and support the target portion of the rotation shaft (5) in a contactless manner using the composite electromagnetic force (F) of the third and fourth electromagnets (53, 54). The direction in which the third and fourth electromagnets (53, 54) face each other (the direction corresponding to a downward direction toward the right in FIG. 3) is perpendicular to the direction in which the first and second electromagnets (51, 52) face each other (the direction corresponding to an upward direction toward the right in FIG. 3) when viewed in plan.

Specifically, in the present example, the radial magnetic bearing (21) includes a magnetic bearing core (61) and eight coils (65). The magnetic bearing core (61) is, for example, a stack of a plurality of electromagnetic steel sheets, and includes a back yoke (62) and eight teeth (63). The back yoke (62) has a cylindrical shape. The eight teeth (63) are regularly angularly spaced (at 45 degrees in the present example) in the circumferential direction along the inner peripheral surface of the back yoke (62), and protrude radially inward from the inner peripheral surface of the back yoke (62). The innermost surfaces (tip surfaces) of the eight teeth (63) face the outer peripheral surface of the target portion of the rotation shaft (5) with a predetermined gap therebetween.

The eight coils (65) are respectively wound around the eight teeth (63) of the magnetic bearing core (61). Thus, eight electromagnet units (first to eighth electromagnet units (71 to 78)) are formed in this example. Specifically, the first electromagnet unit (71), the second electromagnet unit (72), the seventh electromagnet unit (77), the eighth electromagnet unit (78), the third electromagnet unit (73), the fourth electromagnet unit (74), the fifth electromagnet unit (75), and the sixth electromagnet unit (76) are arranged clockwise in this order in FIG. 3.

In the first and second electromagnet units (71, 72), the coils (65) are connected in series to form the first electromagnet (51). In the third and fourth electromagnet units (73, 74), the coils (65) are connected in series to form the second electromagnet (52). The coils in the first electromagnet (51) (i.e., the coils (65) in the first and second electromagnet units (71, 72)) are supplied with a first current (i1), and the coils in the second electromagnet (52) (i.e., the coils (65) in the third and fourth electromagnet units (73, 74)) are supplied with a second current (i2). Controlling the first and second currents (i1, i2) respectively flowing through the first and second electromagnets (51, 52) makes it possible to control the composite electromagnetic force (F) of the first and second electromagnets (51, 52), and control the position of the target portion (axial member) of the rotation shaft (5) in the direction in which the first and second electromagnets (51, 52) face each other (i.e., the radial direction, the upward direction toward the right in FIG. 3).

In the fifth and sixth electromagnet units (75, 76), the coils (65) are connected in series to form the third electromagnet (53). In the seventh and eighth electromagnet units (77, 78), the coils (65) are connected in series to form the fourth electromagnet (54). The coils in the third electromagnet (53) (i.e., the coils (65) in the fifth and sixth electromagnet units (75, 76)) are supplied with a third current (i3), and the coils in the fourth electromagnet (54) (i.e., the coils (65) in the seventh and eighth electromagnet units (77, 78)) are supplied with a fourth current (i4). Controlling the third and fourth currents (i3, i4) respectively flowing through the third and fourth electromagnets (53, 54) makes it possible to control the composite electromagnetic force (F) of the third and fourth electromagnets (53, 54), and control the position of the target portion (axial member) of the rotation shaft (5) in the direction in which the third and fourth electromagnets (53, 54) face each other (i.e., the radial direction perpendicular to the direction in which the first and second electromagnets (51, 52) face each other, the downward direction toward the right in FIG. 3).

The winding direction of the coils (65) and the direction of the current flowing through the coils (65) are set such that the first to fourth electromagnets (51 to 54) generate an attraction force, that is, an electromagnetic force exerted to attract the target portion (axial member) of the rotation shaft (5). Specifically, the winding direction of the coils (65) and the direction of the current flowing through the coils (65) are set to generate a magnetic flux in the directions indicated by the arrows in FIG. 3.

<<Thrust Magnetic Bearing>>

Figure 5:
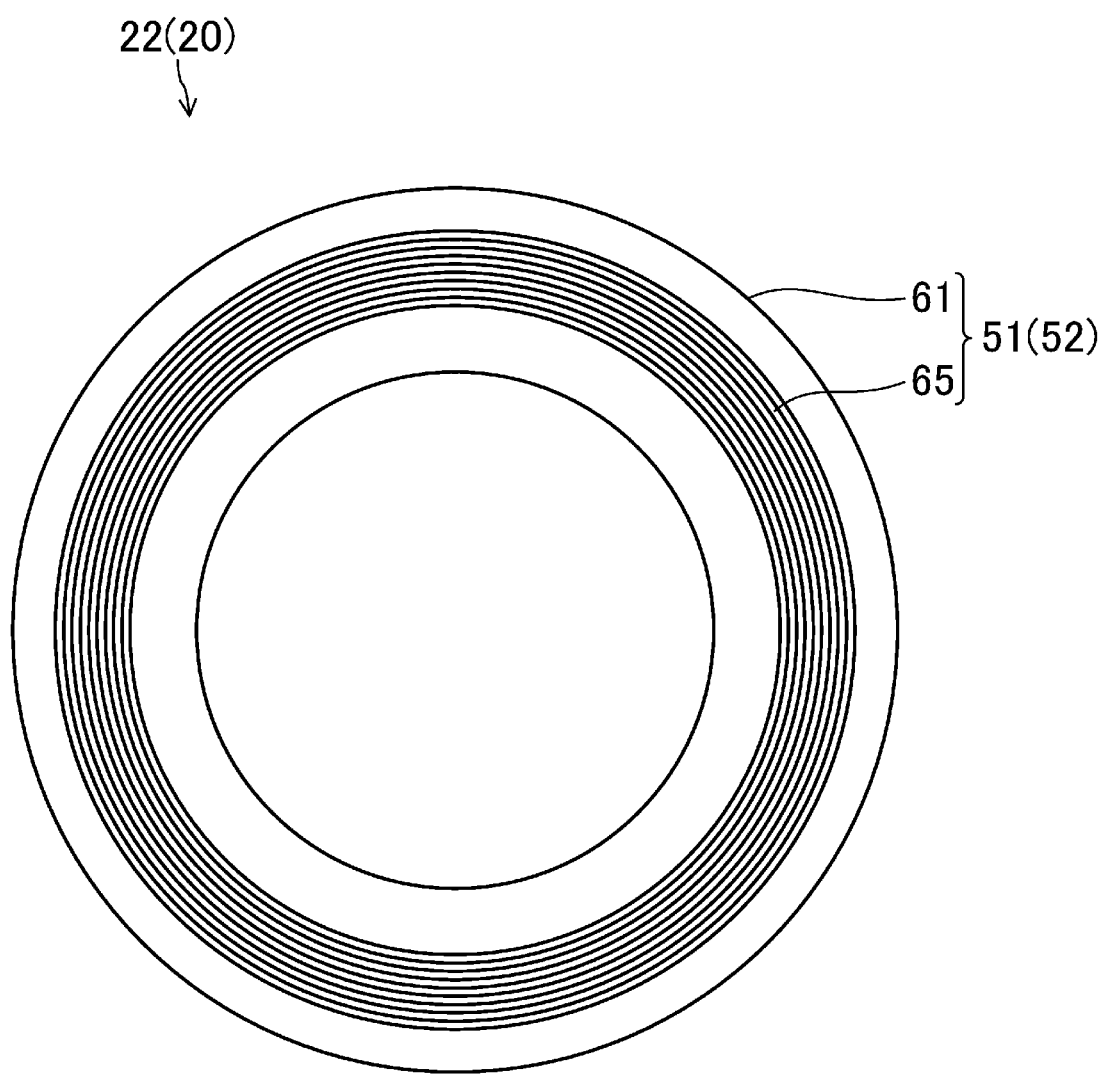
FIG. 5 is a cross-sectional view illustrating an exemplary configuration of a thrust magnetic bearing.
Figure 6:
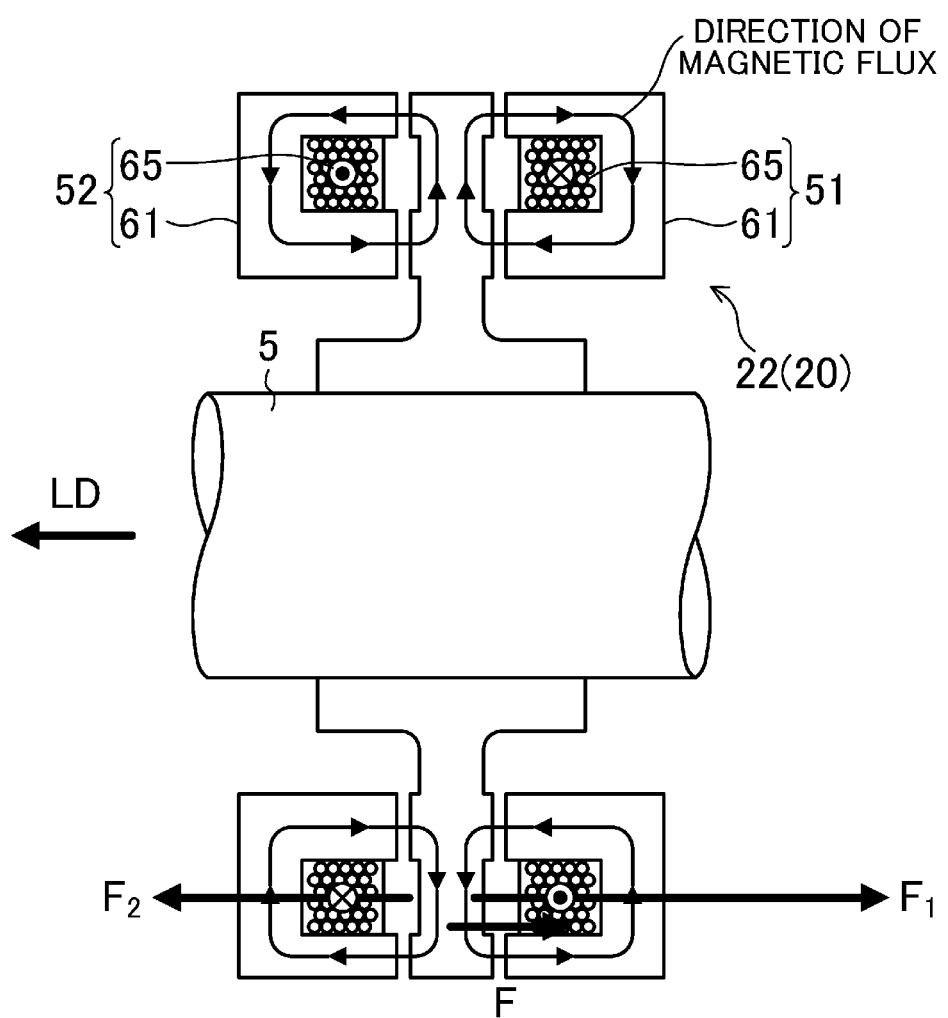
FIG. 6 is a longitudinal section view illustrating an exemplary configuration of the thrust magnetic bearing.

As illustrated in FIG. 5 and FIG. 6, the thrust magnetic bearing (22) includes the first and second electromagnets (51, 52). In the present example, the rotation shaft (5) has the other end (the end on the side opposite to one end to which the impeller (3a) is fixed) having a dimeter that is larger than its body portion, and is provided with a disk portion protruding outwardly in the radial direction. The first and second electromagnets (51, 52) face each other with the target portion (disk portion) of the rotation shaft (5) interposed therebetween, and support the target portion of the rotation shaft (5) in a contactless manner using the composite electromagnetic force (F) of the first and second electromagnets (51, 52).

Specifically, the thrust magnetic bearing (22) in the present example includes two magnetic bearing cores (61) and two coils (65). The two magnetic bearing cores (61) each have an annular shape and are disposed at opposite sides of the target portion (the disk portion) of the rotation shaft (5) in the axial direction with a predetermined gap from the target portion. The surfaces of the magnetic bearing cores (61) facing each other each have a circular groove along the entire circumference. The two coils (65) are respectively accommodated in the circular grooves of the two magnetic bearing cores (61). Thus, two electromagnets (the first and second electromagnets (51, 52)) are formed in the present example. The coils (65) in the first electromagnet (51) are supplied with the first current (i1), and the coils (65) in the second electromagnet (52) are supplied with the second current (i2). Controlling the first and second currents (i1, i2) respectively flowing in the first and second electromagnets (51, 52) controls the composite electromagnetic force (F) of the first and second electromagnets (51, 52), which can in turn control the position of the target portion (the disk portion (5a)) of the rotation shaft (5) in the direction in which the first and second electromagnets (51, 52) face each other (that is, in the axial direction, in the horizontal direction in FIG. 6).

The winding direction of the coils (65) and the direction of the current flowing through the coils (65) are set such that the first and second electromagnets (51, 52) generate an attraction force, that is, an electromagnetic force exerted to attract the target portion (the disk portion) of the rotation shaft (5). Specifically, the winding direction of the coils (65) and the direction of the current flowing through the coils (65) are set to generate a magnetic flux in the directions indicated by the arrows in FIG. 6.

<Position Sensor>

As illustrated in FIG. 2, the position sensor (30) is configured to output a detection signal having a signal level according to the position of the target member (in the present example, the target portion of the rotation shaft (5)) in a predetermined position detection direction (a direction targeted in position detection). In the present example, the position sensor (30) corresponds to a pair of electromagnets (for example, the set of first and second electromagnets (51, 52)) facing each other with the target member interposed therebetween, and the direction in which the pair of electromagnets face each other is defined as the position detection direction. The position sensor (30) may include, for example, an eddy current displacement sensor.

In the present example, five position sensors (30) are composed of four radial position sensors (31) and one thrust position sensor (32).

<<Radial Position Sensor>>

The four radial position sensors (31) include a radial position sensor (will be hereinafter referred to as a "first radial position sensor (31)") corresponding to the set of first and second electromagnets (51, 52) in the first radial magnetic bearing (21), a radial position sensor (will be hereinafter referred to as a "second radial position sensor (31)") corresponding to the set of third and fourth electromagnets (53, 54) in the first radial magnetic bearing (21), a radial position sensor (will be hereinafter referred to as a "third radial position sensor (31)") corresponding to the set of first and second electromagnets (51, 52) in the second radial magnetic bearing (21), and a radial position sensor (will be hereinafter referred to as a "fourth radial position sensor (31)") corresponding to the set of third and fourth electromagnets (53, 54) in the second radial magnetic bearing (21).

As for the first and third radial position sensors (31), the direction in which the first and second electromagnets (51, 52) face each other (i.e., the radial direction, or the upward direction toward the right in FIG. 3) is defined as the position detection direction. As for the second and fourth radial position sensors (31), the direction in which the third and fourth electromagnets (53, 54) face each other (i.e., the radial direction perpendicular to the direction in which the first and second electromagnets (51, 52) face each other, or the downward direction toward the right in FIG. 3) is defined as the position detection direction.

<<Thrust Position Sensor>>

The thrust position sensor (32) corresponds to the set of first and second electromagnets (51, 52) in the thrust magnetic bearing (22), and the direction in which the first and second electromagnets (51, 52) face each other (i.e., the axial direction, or the lateral direction in FIG. 6) is defined as the position detection direction.

<Touchdown Bearing>

The touchdown bearing (6) is configured to come into contact with the target member (in the present example, the target portion of the rotation shaft (5)) moving toward the magnetic bearing (20) in a space between a plurality of electromagnets (for example, the first and second electromagnets (51, 52)), thereby avoiding contact between the target member and the magnetic bearing (20).

In the present example, four touchdown bearings (6) are composed of two radial touchdown bearings (7) and two thrust touchdown bearings (8). Hereinafter, one of the two radial touchdown bearing (7) will be referred to as a "first radial touchdown bearing (7)," and the other will be referred to as a "second radial touchdown bearing (7)." One of the two thrust touchdown bearings (8) will be referred to as a "first thrust touchdown bearing (8)," and the other will be referred to as a "second thrust touchdown bearing (8)."

<<Radial Touchdown Bearing>>

The first and second radial touchdown bearings (7) respectively correspond to the first and second radial magnetic bearings (21) and are arranged near the first and second radial magnetic bearings (21) (in the present example, on the outer side in the axial direction).

The radial touchdown bearing (7) has a cylindrical form through which the target member (in the present example, the axial member of the rotation shaft (5)), having an axial form, is inserted. The radial touchdown bearing (7) is configured to come into contact, on the inner peripheral surface thereof, with the target member (in the present example, the axial member of the rotation shaft (5)) moving in the radial direction of the radial touchdown bearing (7), thereby avoiding contact between the target member and the radial magnetic bearing (21). Specifically, the radial touchdown bearing (7) has a smaller inner diameter than the radial magnetic bearing (21).

With the above-described configuration, the movable range of the target member in the position detection direction (specifically, the position detection direction of the radial position sensor (31)) is restricted by the radial touchdown bearing (specifically, the inner peripheral surface of the radial touchdown bearing (7)).

<<Thrust Touchdown Bearing>>

The first and second thrust touchdown bearings (8) each have an annular form, and arranged to face each other in the axial direction of the target member with the target member (in the present example, a large diameter portion on the other end of the rotation shaft (5)) interposed therebetween. The first and second thrust touchdown bearings (8) are configured to come into contact, on their surfaces facing each other, with the target member (in the present example, the large diameter portion on the other end of the rotation shaft (5)) moving in the direction in which the first and second thrust touchdown bearings (8) face each other, thereby avoiding contact between the target member and the thrust magnetic bearing (22).

Specifically, the first and second thrust touchdown bearings (8) respectively correspond to the first and second electromagnets (51, 52) in the thrust magnetic bearing (22). The large diameter portion and disk portion of the rotation shaft (5) are shaped, and the first and second electromagnets (51, 52) in the thrust magnetic bearing (22) and the first and second thrust touchdown bearings (8) are arranged, such that the gap between the first thrust touchdown bearing (8) and the large diameter portion of the rotation shaft (5) is narrower than the gap between the first electromagnet (51) in the thrust magnetic bearing (22) and the disk portion of the rotation shaft (5), and that the gap between the second thrust touchdown bearing (8) and the large diameter portion of the rotation shaft is narrower than the gap between the second electromagnet (52) in the thrust magnetic bearing (22) and the disk portion of the rotation shaft (5).

With the above-described configuration, the movable range of the target member in the position detection direction (specifically, the position detection direction of the thrust position sensor (32)) is restricted by the first and second thrust touchdown bearings (8) facing each other.

<Controller>

The controller (40) is configured to control one or a plurality of magnetic bearings (20) to support a target member (in the present example, the target portion of the rotation shaft (5)) in a contactless manner. More specifically, the controller (40) is configured to control each pair of electromagnets (in the present example, five pairs of electromagnets) in one or a plurality of magnetic bearings (20).

In the present example, the controller (40) has a first mode and a second mode, and is configured to acquire a reference value (R) that correlates with a change in an input-output characteristic of the position sensor (30) following a change in the ambient temperature of the position sensor (30). The input-output characteristic of the position sensor (30) and the reference value (R) will be described in detail later.

The controller (40) is configured to perform a movement control operation and an information acquisition operation in the first mode. In the movement control operation, the controller (40) controls the composite electromagnetic force (F) of a plurality of electromagnets (for example, the first and second electromagnets (51, 52)) such that the target member moves in the position detection direction (the direction targeted in position detection with the position sensor (30)). In the present example, the controller (40) performs the movement control operation in the first mode such that the target member moves from one end to another end of the movable range in the position detection direction restricted by the touchdown bearing (6). In the information acquisition operation, the controller (40) acquires temperature drift correlation information indicative of a correlation between the reference value (R) and the input-output characteristic of the position sensor (30) (specifically, a change in the input-output characteristic of the position sensor (30) following a change in the reference value (R)), based on the reference value (R) and the input-output characteristic of the position sensor (30) in the movement control operation. In this context, the input-output characteristic of the position sensor (30) in the movement control operation can be estimated based on limit values (maximum value, minimum value) of the moving range of the target member in the position detection direction in the movement control operation and limit values (maximum value, minimum value) of the variable range of the signal level of the detection signal from the position sensor (30) in the movement control operation. The temperature drift correlation information will be described in detail later.

The controller (40) is configured to perform a magnetic levitation control operation and a temperature compensation operation in the second mode. In the magnetic levitation control operation, the controller (40) controls the composite electromagnetic force (F) of a plurality of electromagnets (for example, the first and second electromagnets (51, 52)), based on the signal level of the detection signal from the position sensor (30). In the temperature compensation operation, the controller (40) compensates the input-output characteristic of the position sensor (30) based on the temperature drift correlation information and the reference value (R) in the magnetic levitation control operation such that the correlation between a position deviation of the target member in the position detection direction in the magnetic levitation control operation and the composite electromagnetic force (F) of the plurality of electromagnets becomes a predetermined correlation. Specifically, in the temperature compensation operation, the controller (40) compensates the input-output characteristic of the position sensor (30) based on the temperature drift correlation information and the reference value (R) in the magnetic levitation control operation such that the control characteristic (i.e., a change in the composite electromagnetic force (F) following a change in the position deviation of the target member in the position detection direction) in the magnetic levitation control operation becomes a predetermined control characteristic (for example, the control characteristic with which the reference value (R) is a predetermined value). The position deviation of the target member in the position detection direction refers to a difference between the position of the target member in the position detection direction and a predetermined target value.

<Input-Output Characteristic of Position Sensor>

Figures 7, 8:
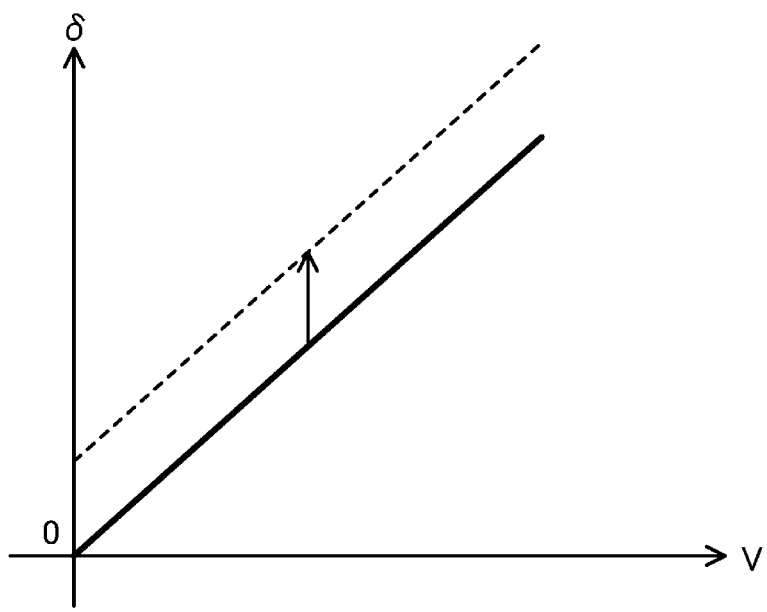
FIG. 7 is a graph illustrating an exemplary input-output characteristic of a position sensor.
FIG. 8 is a table illustrating an exemplary temperature drift map indicative of correspondence between refrigerant temperature and drift amount.

The input-output characteristic of the position sensor (30) will be described below with reference to FIG. 7. FIG. 7 is a graph plotting the position of the target member relative to the position sensor (30) (amount of displacement (6)) on the vertical axis and the signal level (voltage value (V)) of the detection signal from the position sensor (30) on the horizontal axis. As represented by the solid line in FIG. 7, in the present example, the input-output characteristic of the position sensor (30) (i.e., a relation between the position of the target member based on the position sensor (30) and the signal level of the detection signal from the position sensor (30)) have a linear relation. In the following description, the straight line indicative of the input-output characteristic of the position sensor (30) (the straight line in the graph plotting the position of the target member relative to the position sensor (30) on the vertical axis and the signal level of the detection signal from the position sensor (30) on the horizontal axis) is referred to as an "input-output characteristic straight line."

The input-output characteristic of the position sensor (30) tends to change in accordance with a change in the ambient temperature of the position sensor (30). In other words, the detection signal from the position sensor (30) contains components of a temperature drift (a change in the input-output characteristic following a change in temperature) of the position sensor (30). In the present example, as represented by the dashed line in FIG. 7, the intercept value of the input-output characteristic straight line of the position sensor (30) changes in accordance with a change in the ambient temperature of the position sensor (30). Note that in the example in FIG. 7, the slope of the input-output characteristic straight line of the position sensor (30) does not change.

<Reference Value>

The following describes the reference value (R). The reference value (R) is a parameter value that correlates with a change in the input-output characteristic of the position sensor (30) following a change in the ambient temperature of the position sensor (30). The ambient temperature of the position sensor (30) tends to change for various factors. For example, with the air conditioner (100) illustrated in FIG. 1, the ambient temperature of the position sensor (30) tends to change as the temperature of a refrigerant used for cooling the motor (4) changes, and in turn, the input-output characteristic of the position sensor (30) changes. In this case, the temperature of the refrigerant used for cooling the motor (4) (for example, the detection value of the refrigerant temperature sensor (150b)) can be used as the reference value (R).

In addition, parameter values used for controlling peripheral devices of the magnetic bearing device (10) (for example, the motor (4), the compressor (1) incorporating the motor (4), and the air conditioner (100) incorporating the compressor (1)) may be used as the reference value (R). Alternatively, the detection value of a temperature sensor (not illustrated) configured to detect the ambient temperature of the position sensor (30) may also be used as the reference value (R). Specific examples of the reference value (R) will be described in detail later.

<Temperature Drift Correlation Information>

The following describes the temperature drift correlation information with reference to FIG. 8. The temperature drift correlation information indicates a correlation between the reference value (R) in the movement control operation and the input-output characteristic of the position sensor (30) (specifically, a change in the input-output characteristic of the position sensor (30) following a change in the reference value (R)). In the example illustrated in FIG. 8, the temperature drift correlation information provides a temperature drift map (correspondence table) in which the reference value (R) and the input-output characteristic of the position sensor (30) are associated with each other. More specifically, in the temperature drift map illustrated in FIG. 8 (an example of the temperature drift correlation information), the refrigerant temperature, which is an example of the reference value (R), and the drift amount, which is an example of the input-output characteristic of the position sensor (30), are associated with each other. The refrigerant temperature corresponds to the detection value of the refrigerant temperature sensor (150b) illustrated in FIG. 1 (the temperature of the refrigerant used for cooling the motor (4)). The drift amount corresponding to each value of the refrigerant temperature (reference value (R)) represents a difference value obtained by subtracting the intercept value of the input-output characteristic straight line corresponding to the input-output characteristic of the position sensor (30) when the reference value (R) is a predetermined base value (in the present example, 23° C.) from the intercept value of the input-output characteristic straight line corresponding to the input-output characteristic of the position sensor (30) when the refrigerant temperature is a value corresponding to the drift amount (for example, 45° C.).

<Configuration of Controller>

In the present example, as illustrated in FIG. 2, the controller (40) includes one or a plurality of (in the present example, five) partial control units (41) corresponding to one or more pairs of electromagnets and one mode control unit (42). The partial control unit (41) has a first mode and a second mode.

<<Mode Control Unit>>

The mode control unit (42) is configured to control the operation mode of the partial control unit (41). In the present example, the mode control unit (42) is configured to control the operation mode of the partial control unit (41) in accordance with whether an external device (for example, the motor control device (160)) has issued a request of magnetic levitation control for the controller (40) and a fluctuation range of the reference value (R) (a fluctuation range within a predetermined period of time). Specifically, the mode control unit (42) sets the operation mode of the partial control unit (41) to the first mode when no request of magnetic levitation control has been issued and the fluctuation range of the reference value (R) is below a predetermined fluctuation range threshold, stops the partial control unit (41) when no request of magnetic levitation control has been issued and the fluctuation range of the reference value (R) is at least the fluctuation range threshold, and sets the operation mode of the partial control unit (41) to the second mode when a request of magnetic levitation control has been issued. This control enables operation in the first mode in a state with a stable reference value (R) (a state with a relatively small fluctuation in the reference value (R)), whereby the temperature drift correlation information can be accurately acquired.

The mode control unit (42) may be configured, when no request of magnetic levitation control has been issued, to set the operation mode of the partial control unit (41) to the first mode if the fluctuation range of the reference value (R) is below the fluctuation range threshold and the difference between the current reference value (R) and the reference value (R) in the previous first mode exceeds a predetermined difference threshold, and to stop the partial control unit (41) otherwise (i.e., if the fluctuation range of the reference value (R) is at least the fluctuation range threshold, or if the difference between the current reference value (R) and the reference value (R) in the previous first mode does not exceed the difference threshold). This control can prevent repetitive operation in the first mode for the same reference value (R), whereby operation in the first mode can be performed effectively.

Alternatively, the mode control unit (42) may be configured, when no request of magnetic levitation control has been issued, to set the operation mode of the partial control unit (41) in the first mode if the fluctuation range of the reference value (R) is below the fluctuation range threshold and the current reference value (R) falls within a predetermined measurement target range, and to stop the partial control unit (41) otherwise (if the fluctuation range of the reference value (R) is at least the fluctuation range threshold, or if the current reference value (R) does not fall within the measurement target range). This control enables operation in the first mode for the reference value (R) that can be efficiently used as the temperature drift correlation information, whereby operation in the first mode can be performed effectively.

Alternatively, the mode control unit (42) may be configured, when no request of magnetic levitation control has been issued, to set the operation mode of the partial control unit (41) to the first mode if the fluctuation range of the reference value (R) is below the fluctuation range threshold, the difference between the current reference value (R) and the reference value (R) in the previous first mode exceeds the difference threshold, and the current reference value (R) falls within the measurement target range, and to stop the partial control unit (41) otherwise (if the fluctuation range of the reference value (R) is at least the fluctuation range threshold, the difference between the current reference value (R) and the reference value (R) in the previous first mode does not exceed the difference threshold, or the current reference value (R) does not fall within the measurement target range).

<<Partial Control Unit>>

In the present example, five partial control units (41) are composed of four radial control units (401) and one thrust control unit (402). The four radial control units (401) are composed of a radial control unit (will be hereinafter referred to as a "first radial control unit (401)") corresponding to the set of first and second electromagnets (51, 52) in the first radial magnetic bearing (21) and the first radial position sensor (31), a radial control unit (will be hereinafter referred to as a "second radial control unit (401)") corresponding to the set of third and fourth electromagnets (53, 54) in the first radial magnetic bearing (21) and the second radial position sensor (31), a radial control unit (will be hereinafter referred to as a "third radial control unit (401)") corresponding to the set of first and second electromagnets (51, 52) in the second radial magnetic bearing (21) and the third radial position sensor (31), and a radial control unit (will be hereinafter referred to as a "fourth radial control unit (401)") corresponding to the set of third and fourth electromagnets (53, 54) in the second radial magnetic bearing (21) and the fourth radial position sensor (31). The thrust control unit (402) corresponds to the set of first and second electromagnets (51, 52) in the thrust magnetic bearing (22) and the thrust position sensor (32).

<<Details of Partial Control Unit>>

Figure 9:
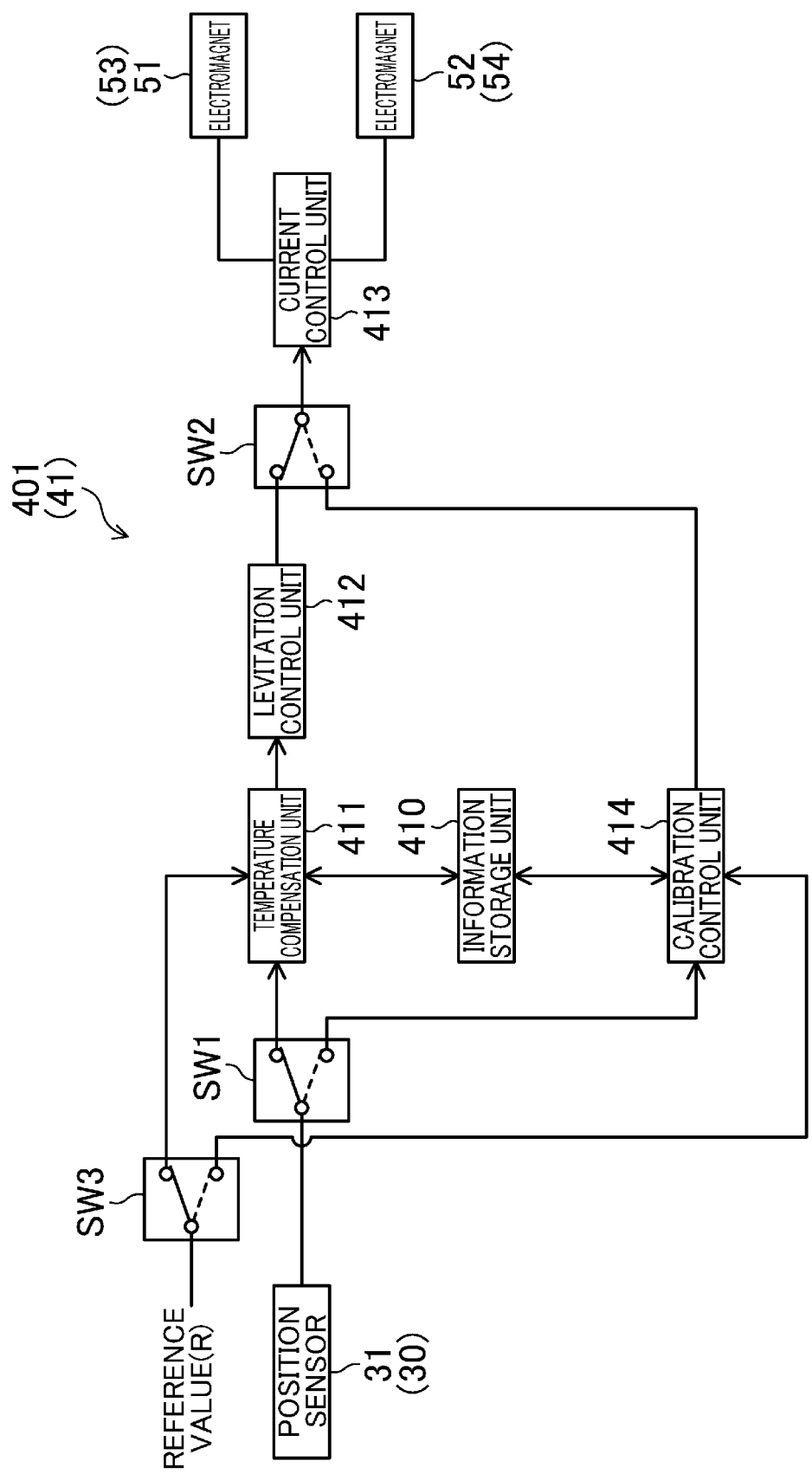
FIG. 9 is a block diagram illustrating an exemplary configuration of a partial control unit.

FIG. 9 illustrates an exemplary configuration of the partial control unit (41). The partial control unit (41) includes an information storage unit (410), a temperature compensation unit (411), a levitation control unit (412), a current control unit (413), a calibration control unit (414), a first switch (SW1), a second switch (SW2), and a third switch (SW3).

The information storage unit (410) stores temperature drift correlation information indicative of a correlation between the reference value (R) and the input-output characteristic of the position sensor (30). In the present example, the information storage unit (410) stores the temperature drift map (an example of the temperature drift correlation information) illustrated in FIG. 8. In the temperature drift map illustrated in FIG. 8, the refrigerant temperature serving as an example of the reference value (R) (specifically, the detection value of the refrigerant temperature sensor (150b)) and the drift amount serving as an example of the input-output characteristic of the position sensor (30) (specifically, a difference value on the intercept value of the input-output characteristic straight line of the position sensor (30)) are associated with each other.

The first switch (SW1) is configured to switch between a first state (the state illustrated by the dashed lines in FIG. 9) in which the detection signal from the position sensor (30) is supplied to the calibration control unit (414), and a second state (the state illustrated by the solid lines in FIG. 9) in which the detection signal from the position sensor (30) is supplied to the temperature compensation unit (411). The second switch (SW2) is configured to switch between a first state (the state illustrated by the dashed lines in FIG. 9) in which an output from the calibration control unit (414) is supplied to the current control unit (413), and a second state (the state illustrated by the solid lines in FIG. 9) in which an output from the levitation control unit (412) is supplied to the current control unit (413). The third switch (SW3) is configured to switch between a first state (the state illustrated by the dashed lines in FIG. 9) in which the reference value (R) is supplied to the calibration control unit (414), and a second state (the state illustrated by the solid lines in FIG. 9) in which the reference value (R) is supplied to the temperature compensation unit (411).

First Mode

The mode control unit (42) sets the first switch (SW1), the second switch (SW2), and the third switch (SW3) in the first state (the state illustrated by the dashed lines in FIG. 9), thereby setting the operation mode of the partial control unit (41) in the first mode. In the first mode, the detection signal from the position sensor (30) and the reference value (R) are supplied to the calibration control unit (414), and the output from the calibration control unit (414) is supplied to the current control unit (413).

The calibration control unit (414) outputs a current instruction value based on a predetermined control rule such that the target member moves within the predetermined moving range in the position detection direction. The current control unit (413) controls a pair of currents (for example, the set of first and second currents (i1, i2)) flowing through a pair of electromagnets in accordance with the current instruction value output from the calibration control unit (414). In this manner, the composite electromagnetic force (F) of a plurality of electromagnets (for example, the first and second electromagnets (51, 52)) is controlled, and the target member moves in the position detection direction. Thus, the movement control operation is performed. Details of the movement control operation will be described later for the operation with the radial control unit (401) and for the operation with the thrust control unit (402).

The calibration control unit (414), as well as outputting the current instruction value, monitors the signal level of the detection signal from the position sensor (30) supplied to the calibration control unit (414), and acquires the input-output characteristic of the position sensor (30). Specifically, the calibration control unit (414) estimates the input-output characteristic of the position sensor (30) based on limit values (maximum value, minimum value) of the moving range of the target member in the position detection direction and limit values (maximum value, minimum value) of the variable range of the signal level of the detection signal from the position sensor (30).

In the present example, the calibration control unit (414) converts the detection signal from the position sensor (30) into a position detection value (a value indicative of the position of the target member and corresponding to the signal level of the detection signal), based on a predetermined conversion law. The conversion law is a law for converting the signal level (voltage value (V)) of the detection signal from the position sensor (30) into the position of the target member based on the position sensor (30) (the amount of displacement (6)). The calibration control unit (414) estimates the input-output characteristic straight line of the position sensor (30) (more specifically, a straight line drawn in a graph plotting the position detection value on the vertical axis and the signal level of the detection signal from the position sensor (30) on the horizontal axis), based on limit values (maximum value, minimum value) of the variable range of the position detection value and limit values (maximum value, minimum value) of the moving range of the target member in the position detection direction.

The calibration control unit (414) is configured to update the temperature drift correlation information stored in the information storage unit (410), based on the acquired input-output characteristic of the position sensor (30) and the reference value (R) supplied to the calibration control unit (414). In this manner, new temperature drift correlation information is acquired. Specifically, the calibration control unit (414) associates the acquired input-output characteristic of the position sensor (30) with the reference value (R) supplied to the calibration control unit (414), and registers them in the temperature drift correlation information stored in the information storage unit (410). In this manner, information acquisition operation is performed.

In the present example, the calibration control unit (414) calculates a difference value (drift amount) obtained by subtracting the intercept value of the input-output characteristic straight line of the position sensor (30) when the reference value (R) is a predetermined base value from the intercept value of the currently acquired input-output characteristic straight line of the position sensor (30), associates the difference value and the currently acquired reference value (R), and registers them in the temperature drift map stored in the information storage unit (410).

Second Mode

The mode control unit (42) sets the first switch (SW1), the second switch (SW2), and the third switch (SW3) in the second state (the state illustrated by the solid lines in FIG. 9), thereby setting the operation mode of the partial control unit (41) in the second mode. In the second mode, the detection signal from the position sensor (30) and the reference value (R) are supplied to the temperature compensation unit (411), and the output from the levitation control unit (412) is supplied to the current control unit (413).

The temperature compensation unit (411) compensates the signal level of the detection signal from the position sensor (30) supplied to the temperature compensation unit (411), based on the temperature drift correlation information stored in the information storage unit (410) and the reference value (R) supplied to the temperature compensation unit (411). Specifically, the temperature compensation unit (411) compensates the signal level of the detection signal from the position sensor (30) based on the temperature drift correlation information and the reference value (R) such that the correlation between the position deviation of the target member in the position detection direction and the composite electromagnetic force (F) of a plurality of electromagnets (more specifically, a change in the composite electromagnetic force (F) following a change in the position deviation) becomes a predetermined correlation. Through the compensation of the signal level of the detection signal from the position sensor (30) in this manner, the input-output characteristic of the position sensor (30) can be compensated. The temperature compensation unit (411) then outputs a position detection value in accordance with the compensated signal level of the detection signal from the position sensor (30). In this manner, temperature compensation operation is performed.

In the present example, the temperature compensation unit (411) detects a drift amount corresponding to the reference value (R) supplied to the temperature compensation unit (411), from the temperature drift map stored in the information storage unit (410). The temperature compensation unit (411) in turn converts the signal level of the detection signal from the position sensor (30) into a primary position detection value, based on a predetermined conversion law (the same conversion law as the conversion law used by the calibration control unit (414)), and subtracts the drift amount from the primary position detection value, thereby acquiring a position detection value. The temperature compensation unit (411) may be configured to compensate a drift amount corresponding to the current reference value (R) from the drift amount corresponding to any other reference value (R) registered in the temperature drift map if the temperature drift map does not include any drift amount corresponding to the reference value (R) supplied to the temperature compensation unit (411).

The levitation control unit (412) outputs a current instruction value in accordance with the difference between an output from the temperature compensation unit (411) (in the present example, a position detection value output from the temperature compensation unit (411)) and a preset position instruction value (target value). Specifically, the levitation control unit (412) calculates the current instruction value such that the absolute value of the current instruction value increases with an increase in the difference between the position detection value and the position instruction value. The current control unit (413) controls a pair of currents (for example, the set of first and second currents (i1, i2)) flowing through a coil of a pair of electromagnets in accordance with the current instruction value output from the levitation control unit (412). The composite electromagnetic force (F) of a plurality of electromagnets (for example, first and second electromagnets (51, 52)) is thus controlled, and the composite electromagnetic force (F) is used for supporting a target member in a contactless manner. In this manner, magnetic levitation control operation is performed.

<Movement Control Operation Performed by Radial Control Unit>

The movement control operation performed by the radial control unit (401) will be described below with reference to FIG. 10. When set to the first mode, the first to fourth radial control units (401) perform the movement control operation such that the target member (in the present example, the target portion of the rotation shaft (5)) moves in the circumferential direction of the radial touchdown bearing (7) while coming into contact with the inner peripheral surface of the radial touchdown bearing (7). In the present example, the first to fourth radial control units (401) perform the movement control operation such that the target member makes at least a single circuit along the inner peripheral surface of the radial touchdown bearing (7). Specifically, the first to fourth radial control units (401) control the composite electromagnetic force (F) of the first to fourth electromagnets (51 to 54) in the first radial magnetic bearing (21) and the composite electromagnetic force (F) of the first to fourth electromagnets (51 to 54) in the second radial magnetic bearing (21) such that a direction on which the composite electromagnetic force (F) acts rotates in the circumferential direction, while the intensity of the composite electromagnetic force (F) is maintained at a predetermined intensity (intensity required for pressing the target member against the inner peripheral surface of the radial touchdown bearing (7)).

Figure 10:
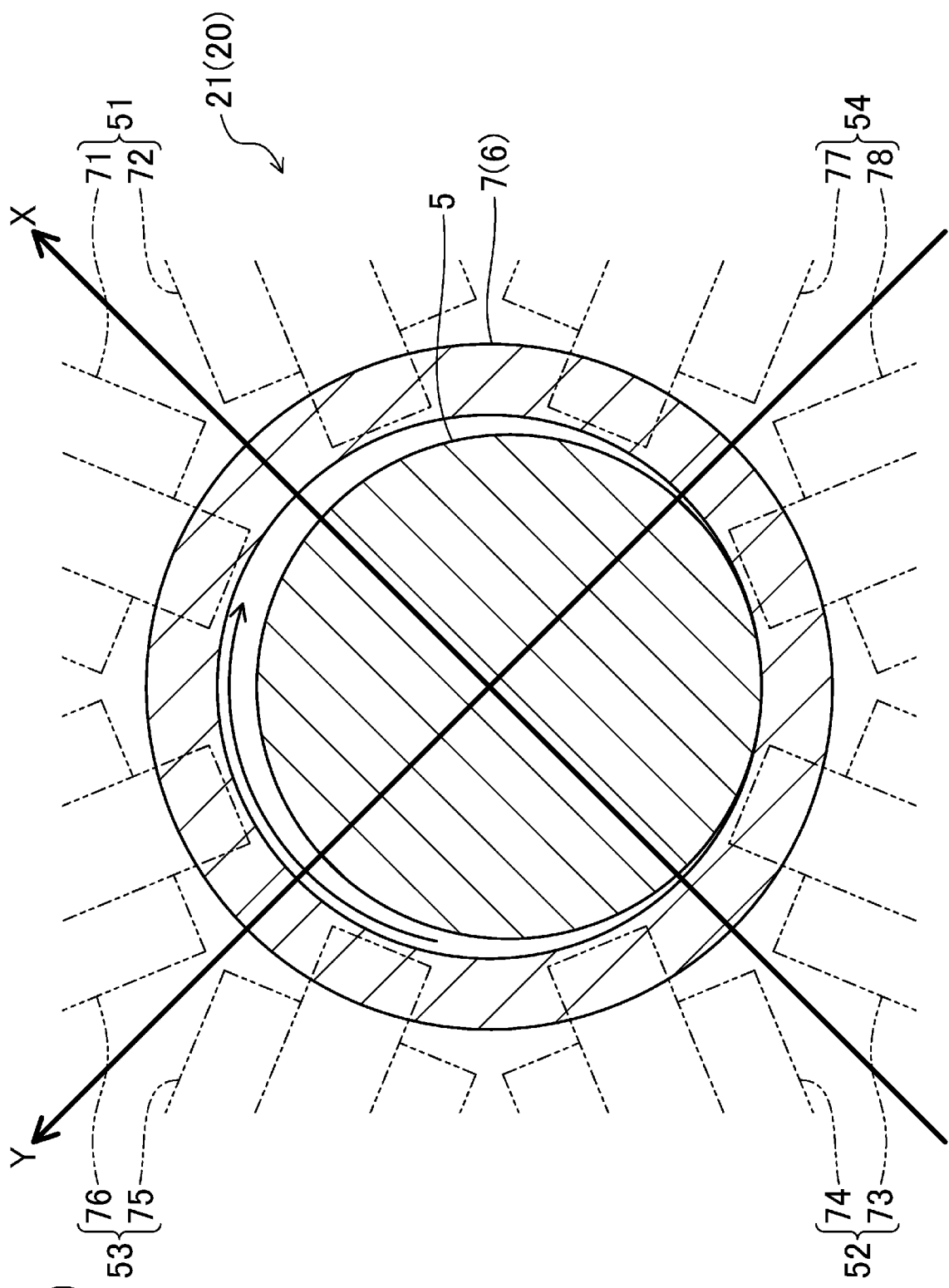
FIG. 10 is a partial cross-sectional view illustrating a movement control operation performed by a radial control unit.

As illustrated in FIG. 10, the target member moves in the circumferential direction of the radial touchdown bearing (7) so as to travel along the inner peripheral surface of the radial touchdown bearing (7) from a stop position. The movement control operation performed such that the target member makes a circuit along the inner peripheral surface of the radial touchdown bearing (7) enables the target member to move from one end to the other end of the movable range of the first and third radial position sensors (31) in the position detection direction (the direction X illustrated in FIG. 10), and also enables the target member to move from one end to the other end of the movable range of the second and fourth radial position sensors (31) in the position detection direction (the direction Y illustrated in FIG. 10).

Note that the intensity of the composite electromagnetic force (F) and the speed for rotating the direction on which the composite electromagnetic force (F) acts, which are required for moving the target member in the circumferential direction of the radial touchdown bearing (7) while coming into contact with the inner peripheral surface and the radial touchdown bearing (7), can be calculated based on the size (inner diameter) of the radial touchdown bearing (7).

<<Movement Control Operation Performed by Thrust Control Unit>>

Figure 11:
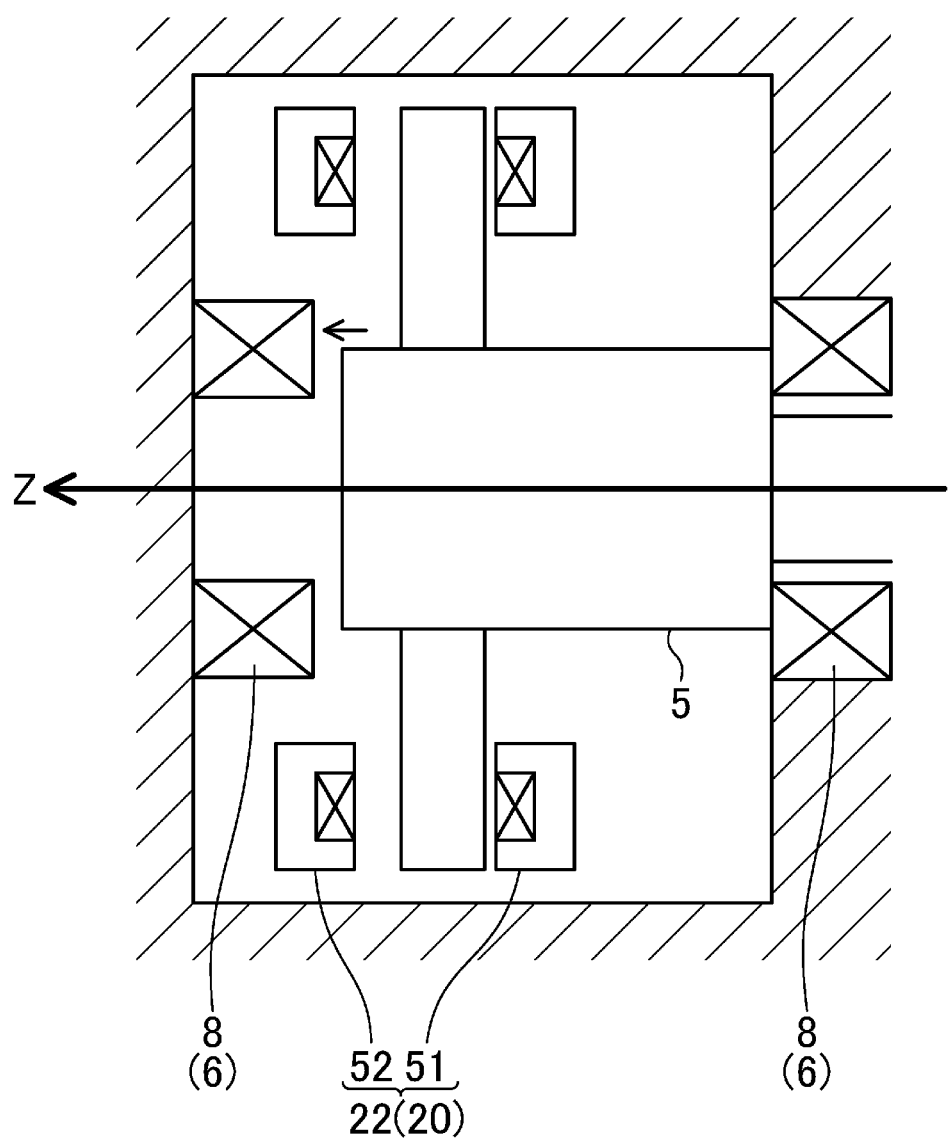
FIG. 11 is a partial longitudinal section view illustrating a movement control operation performed by a thrust control unit.

The following describes the movement control operation performed by the thrust control unit (402) with reference to FIG. 11. When set to the first mode, the thrust control unit (402) performs the movement control operation such that the target member (in the present example, the target portion of the rotation shaft (5)) moves from a surface of one of the first and second thrust touchdown bearings (8) to a surface of the other thrust touchdown bearing (8), the surfaces facing each other. In the present example, the thrust control unit (402) performs the movement control operation such that the target member reciprocates at least once between the first and second thrust touchdown bearings (8). Specifically, the thrust control unit (402) controls the composite electromagnetic force (F) of the first and second electromagnets (51, 52) in the thrust magnetic bearing (22) such that the direction on which the composite electromagnetic force (F) acts reverses at predetermined timing.

As illustrated in FIG. 11, the target member moves in the direction in which the first and second thrust touchdown bearings (8) face each other from the stop position. The movement control operation performed such that the target member reciprocates once between the first and second thrust touchdown bearings (8) enables the target member to move from one end to the other end of the movable range of the thrust position sensor (32) in the position detection direction (the direction Z illustrated in FIG. 11).

Note that the timing at which the direction on which the composite electromagnetic force (F) acts reverses, the timing being required for causing the target member to reciprocate between the first and second thrust touchdown bearings (8), can be calculated based on the distance between the first and second thrust touchdown bearings (8) facing each other.

Advantages of Embodiment

As described above, through the movement control operation and the information acquisition operation performed in the first mode, the input-output characteristic of the position sensor (30) in the real machine (an input-output characteristic that is unique to the position sensor (30) mounted on the magnetic bearing device (10)) can be acquired in association with the reference value (R). In this manner, the temperature drift correlation information indicative of the correlation between the input-output characteristic of the position sensor (30) in the real machine and the reference value (R) can be acquired. Further, through the magnetic levitation control operation and the temperature compensation operation performed in the second mode, the input-output characteristic of the position sensor (30) in the magnetic levitation control operation can be accurately compensated based on the temperature drift correlation information indicative of the correlation between the input-output characteristic of the position sensor (30) in the real machine and the reference value (R). In this manner, errors in magnetic levitation control resulting from the temperature drift of the position sensor (30) can be reduced.

The touchdown bearing (6) is capable of restricting the movable range of the target member in the position detection direction. Specifically, the inner peripheral surface of the radial touchdown bearing (7) is capable of restricting the movable range of the target member in the position detection direction, and thus, the first and second thrust touchdown bearings (8) facing each other are capable of restricting the movable range of the target member in the position detection direction. To correctly estimate the input-output characteristic of the position sensor (30), the movable range of the target member in the position detection direction in the movement control operation is preferably restricted within a predetermined range. With the touchdown bearing (6) successfully restricting the movable range of the target member in the position detection direction, the input-output characteristic of the position sensor (30) in the real machine can be correctly estimated. In this manner, temperature drift correlation information exactly indicative of the correlation between the input-output characteristic of the position sensor (30) in the real machine and the reference value (R) can be acquired, and thus, the input-output characteristic of the position sensor (30) in the magnetic levitation control operation can be more accurately compensated based on the temperature drift correlation information. Consequently, errors in magnetic levitation control resulting from the temperature drift of the position sensor (30) can be further reduced.

Furthermore, the magnetic bearing device is capable of reducing errors in magnetic levitation control resulting from the temperature drift of the position sensor (30), thereby enhancing the operational efficiency of the fluid mechanical system, and thus, enhancing the operational efficiency of the air conditioner (100).

(Modifications of Input-Output Characteristic of Position Sensor)

Figures 12, 13:
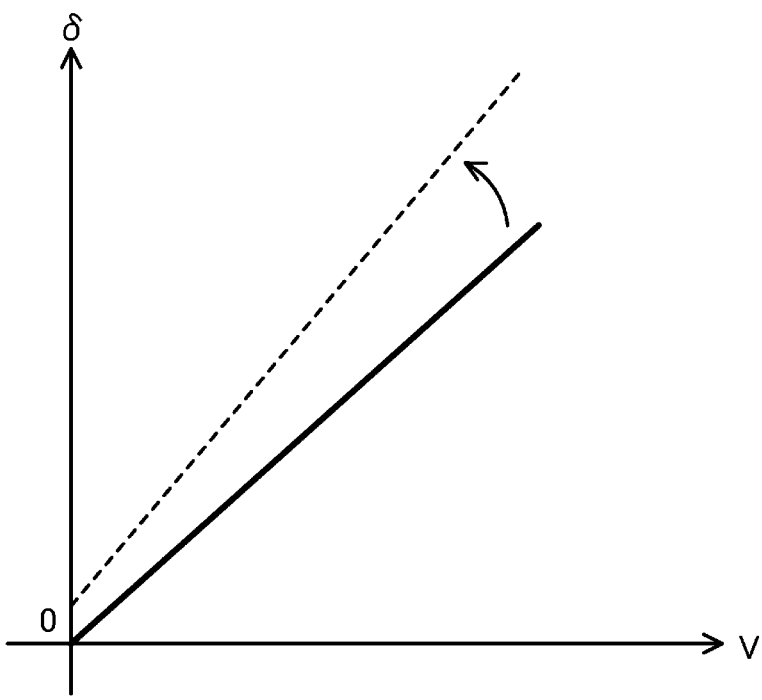
FIG. 12 is a graph illustrating another exemplary input-output characteristic of the position sensor.
FIG. 13 is a table illustrating another exemplary temperature drift map indicative of correspondence between refrigerant temperature and drift amount.

As illustrated in FIG. 12, not only the intercept value, but also the slope value of the input-output characteristic straight line of the position sensor (30) may change in accordance with a change in the ambient temperature of the position sensor (30). If such a temperature drift occurs in the position sensor (30), as illustrated in FIG. 13, values on the slope value and intercept value of the input-output characteristic straight line of the position sensor (30) may be registered in a temperature drift map (an example of the temperature drift correlation information) as drift amounts. Specifically, the reference value (R), a difference value of the slope value of the input-output characteristic straight line (a difference value from the slope value of the input-output characteristic straight line when the reference value (R) is a predetermined base value), and a difference value of the intercept value of the input-output characteristic (a difference value from the intercept value of the input-output characteristic straight line when the reference value (R) is a predetermined base value) may be associated with each other in the temperature drift map.

While the description above gives an example in which the input-output characteristic of the position sensor (30) (i.e., a relation between the position of the target member relative to the position sensor (30) and the signal level of the detection signal from the position sensor (30)) has a linear relation, the input-output characteristic of the position sensor (30) may be non-linear. For example, the line indicative of the input-output characteristic of the position sensor (30) (i.e., the line in the graph plotting the position of the target member relative to the position sensor (30) (the amount of displacement (δ)) on the vertical axis and the signal level of the detection signal from the position sensor (30) (voltage value (V)) on the horizontal axis) may be a curved line. In such a case as well, temperature drift correlation information indicative of a correlation between the reference value (R) and the input-output characteristic of the position sensor (30) can be acquired.

(Modifications of Temperature Drift Correlation Information)

The temperature drift correlation information may provide a conversion law table in which the reference value (R) is associated with a conversion law (a law for converting the signal level of the detection signal from the position sensor (30) into a position detection value). The conversion law corresponding to each value of the reference value (R) can be set based on the input-output characteristic of the position sensor (30) when the reference value (R) is at this value. With this configuration, the calibration control unit (414) is configured to generate the conversion law based on the input-output characteristic straight line of the position sensor (30), associates the conversion law with the reference value (R), and registers them in the conversion law table (an example of the temperature drift correlation information). The temperature compensation unit (411) is configured to detect a conversion law corresponding to the reference value (R) supplied to the temperature compensation unit (411) from the conversion law table, converts the detection signal from the position sensor (30) into a position detection value based on the conversion law, and supplies the position detection value to the levitation control unit (412). With this configuration as well, the input-output characteristic of the position sensor (30) in the magnetic levitation control operation can be accurately compensated, and thus, errors in magnetic levitation control resulting from the temperature drift of the position sensor (30) can be reduced.

(Examples of Reference Value)

While the description above gives an example in which the refrigerant temperature (specifically, the temperature of the refrigerant used for cooling the motor (4)) serves as the reference value (R), various types of parameters including the following can be used as the reference value (R).

(1) Rotational Speed of Rotary Electric Machine

The ambient temperature of the position sensor (30) may tend to increase with an increase in the rotational speed of the rotary electric machine (for example, the motor (4)). In such a case, the rotational speed value of the rotary electric machine may be used as the reference value (R).

(2) Current Flowing Through Rotary Electric Machine

The ambient temperature of the position sensor (30) may tend to increase with an increase in the current flowing through the rotary electric machine. In such a case, the current value of the rotary electric machine may be used as the reference value.

(3) Pressure of Refrigerant

In the air conditioner (100), the pressure of a refrigerant in the refrigerant circuit (110) tends to change in accordance with an operational state of the air conditioner (100). The air conditioner is provided with a refrigerant pressure sensor for detecting the pressure of a refrigerant in the refrigerant circuit (110). The pressure of the refrigerant in the refrigerant circuit (110) may correlate with the ambient temperature of the position sensor (30). In such a case, the detection value of the refrigerant pressure sensor may be used as the reference value (R).

(4) Flow Rate of Refrigerant

In the air conditioner (100), the flow rate of a refrigerant flowing through the refrigerant circuit can be calculated based on information such as the rotational speed of the compressor (1). The flow rate of the refrigerant flowing through the refrigerant circuit (110) may correlate with the ambient temperature of the position sensor (30). In such a case, the calculated value of the flow rate of a refrigerant flowing through the refrigerant circuit may be used as the reference value (R).

(5) Temperature of Control Board

The control board (160a) is provided with a board temperature sensor (not illustrated) for protecting switching elements and other circuit elements of the inverter circuit from heat. The temperature of the control board (160a) (for example, the temperature of a circuit element) may correlate with the ambient temperature of the position sensor (30). In such a case, the detection value of the board temperature sensor may be used as the reference value (R).

(6) Opening Degree of Inlet Guide Vane

An inlet of the compressor (1) may be provided with an inlet guide vane (not illustrated). In this case, adjusting the opening degree of the inlet guide vane can control the flow rate (intake rate) of a refrigerant sucked into the compressor. The intake rate of the compressor (1) may correlate with the ambient temperature of the position sensor (30). In such a case, the opening degree of the inlet guide vane may be used as the reference value (R).

(7) Others

A combination of various types of parameters as described above may be used as the reference value (R).

OTHER EMBODIMENTS

The controller (40) can include a CPU or other arithmetic circuits or a memory. Components of the controller (40) may be provided for a single arithmetic circuit in an integrated manner, or for a plurality of arithmetic circuits in a distributed manner.

While the description gives an example in which the radial magnetic bearing (21) is a heteropolar radial magnetic bearing, the radial magnetic bearing (21) may be a homopolar radial magnetic bearing.

The embodiments described above are given to provide essentially preferable examples and are not intended to restrict the present disclosure, its applications, or the scope of its use in any manner.

INDUSTRIAL APPLICABILITY

As can be seen in the foregoing, the above-described magnetic bearing device is useful as a device for supporting a shaft or other target member in a contactless manner.

DESCRIPTION OF REFERENCE CHARACTERS

1 Compressor (Fluid Mechanical System)
2 Casing
3 Compression Mechanism (Fluid Machine)
3a Impeller
4 Motor (Rotary Electric Machine)
5 Shaft
6 Touchdown Bearing
7 Radial Touchdown Bearing
8 Thrust Touchdown Bearing
10 Magnetic Bearing Device
20 Magnetic Bearing
21 Radial Magnetic Bearing
22 Thrust Magnetic Bearing
30 Position Sensor
31 Radial Position Sensor
32 Thrust Position Sensor
40 Controller
41 Partial Control Unit
401 Radial Control Unit
402 Thrust Control Unit
51 First Electromagnet
52 Second Electromagnet
53 Third Electromagnet
54 Fourth Electromagnet
F Composite Electromagnetic Force
R Reference Value

The invention claimed is:

1. A magnetic bearing device, comprising:
a magnetic bearing including a plurality of electromagnets and configured to support a target member in a contactless manner using composite electromagnetic force of the plurality of electromagnets;
a position sensor configured to output a detection signal having a signal level according to a position of the target member in a predetermined position detection direction;
a controller having a first mode and a second mode and configured to acquire a reference value that correlates with a change in an input-output characteristic of the position sensor following a change in an ambient temperature of the position sensor; and
a touchdown bearing configured to come into contact with the target member moving toward the magnetic bearing in a space between the plurality of electromagnets, thereby avoiding contact between the target member and the magnetic bearing, wherein
the controller performs
in the first mode, a movement control operation for controlling the composite electromagnetic force of the plurality of electromagnets such that the target member moves within a predetermined moving range in the predetermined position detection direction, and an information acquisition operation for acquiring temperature drift correlation information indicative of a correlation between the reference value and the input-output characteristic of the position sensor, based on the reference value and the input-output characteristic of the position sensor in the movement control operation, and
in the second mode, a magnetic levitation control operation for controlling the composite electromagnetic force of the plurality of electromagnets in accordance with the signal level of the detection signal from the position sensor, and a temperature compensation operation for compensating the input-output characteristic of the position sensor in the magnetic levitation control operation, based on the temperature drift correlation information and the reference value in the magnetic levitation control operation, and
the controller performs the movement control operation in the first mode such that the target member moves from one end to another end of a movable range in the position detection direction restricted by the touchdown bearing.

2. The magnetic bearing device according to claim 1, wherein
the target member has an axial form,
the plurality of electromagnets include first and second electromagnets facing each other in a radial direction of the target member with the target member interposed therebetween, and third and fourth electromagnets facing each other in the radial direction of the target member with the target member interposed therebetween, the direction in which the third and fourth electromagnets face each other intersecting with the direction in which the first and second electromagnets face each other,
the position detection direction of the position sensor corresponds to the direction in which the first and second electromagnets face each other,
the touchdown bearing is a radial touchdown bearing through which the target member is inserted,
the radial touchdown bearing is configured to come into contact, on an inner peripheral surface thereof, with the target member moving in a radial direction of the radial touchdown bearing, thereby avoiding contact between the target member and the magnetic bearing, and
the controller performs the movement control operation in the first mode such that the target member moves in a circumferential direction of the radial touchdown bearing while remaining in contact with the inner peripheral surface of the radial touchdown bearing.

3. A fluid mechanical system, comprising:
the magnetic bearing device of claim 2;
a fluid machine;
a rotary electric machine; and
a rotation shaft coupling the fluid machine and the rotary electric machine, wherein
the magnetic bearing device is configured to support a target portion of the rotation shaft in a contactless manner using composite electromagnetic force of the plurality of electromagnets.

4. The magnetic bearing device according to claim 1, wherein
the target member has a disk form,
the plurality of electromagnets include first and second electromagnets facing each other in an axial direction of the target member, the position detection direction of the position sensor corresponds to a direction in which the first and second electromagnets face each other, the touchdown bearing includes first and second thrust touchdown bearings facing each other in the axial direction of the target member with the target member interposed therebetween, the first and second thrust touchdown bearings are configured to come into contact, on their surfaces facing each other, with the target member moving in the direction in which the first and second thrust touchdown bearings face each other, thereby avoiding contact between the target member and the magnetic bearing, and the controller performs the movement control operation in the first mode such that the target member moves from the surface of one of the first and second thrust touchdown bearings to the surface of the other thrust touchdown bearing, the surfaces facing each other.

5. A fluid mechanical system, comprising:
the magnetic bearing device of claim 4;
a fluid machine;
a rotary electric machine; and
a rotation shaft coupling the fluid machine and the rotary electric machine, wherein
the magnetic bearing device is configured to support a target portion of the rotation haft in a contactless manner using composite electromagnetic force of the plurality of electromagnets.

6. A fluid mechanical system, comprising:
the magnetic bearing device of claim 1;
a fluid machine;
a rotary electric machine; and
a rotation shaft coupling the fluid machine and the rotary electric machine, wherein
the magnetic bearing device is configured to support a target portion of the rotation shaft in a contactless manner using composite electromagnetic force of the plurality of electromagnets.

* * * * *